(12) United States Patent
Yamaguchi

(10) Patent No.: US 12,104,254 B2
(45) Date of Patent: Oct. 1, 2024

(54) SURFACE-TREATED STEEL

(71) Applicant: NIPPON STEEL CORPORATION, Tokyo (JP)

(72) Inventor: Shinichi Yamaguchi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/278,429

(22) PCT Filed: Mar. 4, 2022

(86) PCT No.: PCT/JP2022/009421
§ 371 (c)(1),
(2) Date: Aug. 23, 2023

(87) PCT Pub. No.: WO2022/186380
PCT Pub. Date: Sep. 9, 2022

(65) Prior Publication Data
US 2024/0043981 A1    Feb. 8, 2024

(30) Foreign Application Priority Data

Mar. 4, 2021    (JP) ................................. 2021-034369

(51) Int. Cl.
| | | |
|---|---|---|
| *C23C 2/06* | (2006.01) | |
| *B32B 15/04* | (2006.01) | |
| *C21D 9/46* | (2006.01) | |
| *C22C 18/00* | (2006.01) | |
| *C22C 18/04* | (2006.01) | |
| *C22C 38/00* | (2006.01) | |
| *C23C 2/26* | (2006.01) | |
| *C23C 22/05* | (2006.01) | |
| *C23C 28/00* | (2006.01) | |

(52) U.S. Cl.
CPC ............... *C23C 2/06* (2013.01); *B32B 15/04* (2013.01); *C21D 9/46* (2013.01); *C22C 18/00* (2013.01); *C22C 18/04* (2013.01); *C22C 38/00* (2013.01); *C23C 2/26* (2013.01); *C23C 22/05* (2013.01); *C23C 28/00* (2013.01); *C21D 2201/03* (2013.01)

(58) Field of Classification Search
CPC ...................................................... C23C 2/06
See application file for complete search history.

(56) References Cited

U.S. PATENT DOCUMENTS

| | | | |
|---|---|---|---|
| 5,525,431 A | * | 6/1996 | Kanamaru ............. C23C 22/53 148/262 |
| 5,897,948 A | | 4/1999 | Sakon et al. |
| 2009/0110921 A1 | | 4/2009 | Kaneto et al. |
| 2016/0237572 A1 | | 8/2016 | Iwamizu et al. |
| 2018/0002813 A1 | | 1/2018 | Ishizuka et al. |
| 2019/0010613 A1 | | 1/2019 | Shoji et al. |
| 2022/0145473 A1 | | 5/2022 | Shoji et al. |

FOREIGN PATENT DOCUMENTS

| | | |
|---|---|---|
| JP | 2009-242815 A | 10/2009 |
| JP | 4776458 B | 9/2011 |
| JP | 2015-117433 A | 6/2015 |
| JP | 6191806 B | 9/2017 |
| JP | 6272207 B | 1/2018 |
| WO | 97/00337 A1 | 1/1997 |
| WO | 2015/072154 A1 | 5/2015 |
| WO | 2016/125741 A1 | 8/2016 |
| WO | 2016/203703 A1 | 12/2016 |
| WO | 2017/010571 A1 | 1/2017 |
| WO | 2020/189769 | 9/2020 |

OTHER PUBLICATIONS

Written Opinion for corresponding Application No. PCT/JP2022/009421, mailed May 24, 2022.

* cited by examiner

*Primary Examiner* — Jophy S. Koshy
(74) *Attorney, Agent, or Firm* — Renner, Otto, Boisselle & Sklar, LLP

(57) ABSTRACT

Surface-treated steel including a steel sheet; a plated layer including zinc formed on the steel sheet; and a film formed on the plated layer, the film having a thickness of 100 nm or more and 1000 nm or less, and including an amorphous phase A containing Si, C, O, P, Zn, and V, and one or more selected from the group consisting of Ti, Zr, and Al as constituent elements, with a Zn/Si ratio of peak intensity between Zn and Si, is 1.0 or more, and a mass ratio between V and P, V/P is 0.050 to 1.000 when analyzed by EDS; and an amorphous phase B containing Si, O, and Zn, having a Zn/Si ratio of less than 1.0, and Zn content of the amorphous phase A is 10 mass % or less, when analyzed by EDS.

2 Claims, 1 Drawing Sheet

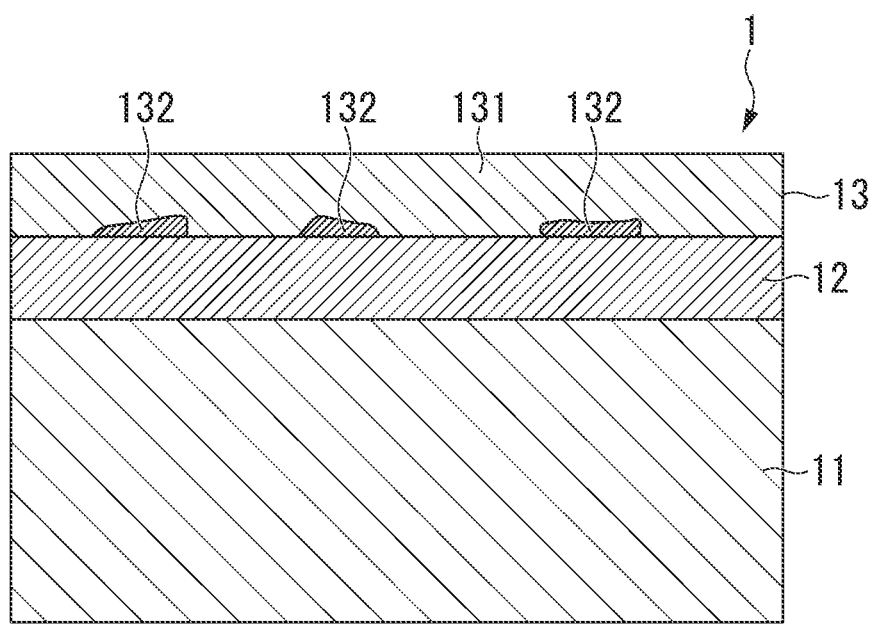

SURFACE-TREATED STEEL

TECHNICAL FIELD OF THE INVENTION

The present invention relates to a surface-treated steel.

The present application claims priority based on Japanese Patent Application No. 2021-034369 filed in Japan on Mar. 4, 2021, the contents of which are incorporated herein by reference.

RELATED ART

Conventionally, a plated steel sheet (zinc-based plated steel sheet) in which a plated layer mainly composed of zinc is formed on a surface of a steel sheet has been used in a wide range of applications such as automobiles, building materials, and home electric appliances. Normally, the surface of the plated steel sheet is subjected to a chromium-free chemical conversion treatment in order to impart further corrosion resistance without being coated with oil.

The chemical conversion treatment film formed by this chemical conversion treatment is required to uniformly cover the surface, to have excellent adhesion to plating, and to have excellent corrosion resistance. However, since the surface of the zinc-based plated steel sheet is covered with an oxide film, in some cases the oxide film becomes an obstacle even if it is attempted to form the chemical conversion treatment film, the adhesion of the chemical conversion treatment film is low, and coating defects and coating unevenness due to the decrease in the adhesion of the chemical conversion treatment film occur, or the chemical conversion treatment film may be peeled off from the plated layer.

In order to solve such a problem to be solved, for example, Patent Document 1 discloses that a film containing an acrylic resin, zirconium, vanadium, phosphorus, and cobalt, in which the area fraction of the acrylic resin is 80 to 100 area % in a region from the surface to a thickness of ⅕ in a cross section of the film, and the area fraction of the acrylic resin is 5 to 50 area % in a region including a region from the center of the film thickness to a thickness of 1/10 on the surface side and a region from the center of the film thickness to a thickness of 1/10 on the plated layer side is formed on a zinc-containing plated steel sheet, so that a film having good adhesiveness to an adhesive and excellent corrosion resistance is obtained.

Patent Document 2 discloses a surface-treated steel sheet including a steel sheet and a resin-based chemical conversion treatment film, in which the resin-based chemical conversion treatment film has colloidal particles of a matrix resin and a poorly soluble chromate dispersed in the matrix resin in a weight ratio of 50/1 to 1/1, and the colloid has an average particle diameter of particles dispersed in the matrix resin of less than 1 m.

Patent Document 2 states that this surface-treated steel sheet is excellent in chromium elution resistance, SST (240 hr), corrosion resistance of processed part, and treatment solution stability.

Patent Document 3 discloses a chemical conversion treatment steel sheet including: a Zn-based plated steel sheet having a Zn-based plated layer containing Al: 0.1 to 22.0 mass %; and a chemical conversion treatment film disposed on the Zn-based plated layer, in which the chemical conversion treatment film includes a first chemical conversion treatment layer disposed on a surface of the Zn-based plated layer and containing V, Mo, and P, and a second chemical conversion treatment layer disposed on the first chemical conversion treatment layer and containing a group 4A metal oxyacid salt, and a proportion of a pentavalent V to a total V in the chemical conversion treatment film is 0.7 or more.

Patent Document 3 discloses that this chemical conversion treatment steel sheet is a chemical conversion treatment steel sheet including a Zn-based plated steel sheet as an original sheet, can be manufactured even when the coated chemical conversion treatment solution is dried at a low temperature in a short time, and has excellent corrosion resistance and blackening resistance.

Patent Document 4 discloses a surface-treated steel comprised of a metal material having (1) a surface, on which an aqueous metal surface treatment agent is coated and dried, the aqueous metal surface treatment agent comprising: (2) an organic silicon compound (W), obtained by blending a silane coupling agent (A) containing one amino group in its molecule and a silane coupling agent (B) containing one glycidyl group in its molecule in a solid content mass ratio [(A)/(B)] of 0.5 to 1.7 and containing, in its molecule, at least two functional groups (a) of the formula —$SiR^1R^2R^3$ (wherein $R^1$, $R^2$ and $R^3$ each independently represent an alkoxy group or a hydroxyl group, and at least one of $R^1$, $R^2$ and $R^3$ represents an alkoxy group) and one or more of at least one kind of hydrophilic functional group (b) selected from hydroxy group (one separate from that able to be included in the functional group (a)) and an amino group, and having an average molecular weight of 1000 to 10000, (3) at least one kind of fluoro compound (X) selected from fluorotitanic acid or fluorozirconic acid; (4) phosphoric acid (Y); and (5) a vanadium compound (Z), so as to form a composite film containing the different components, and among the components of the composite film, (6) the solid content mass ratio [(X)/(W)] of the organic silicon compound (W) and fluoro compound (X) being 0.02 to 0.07, (7) the solid content mass ratio [(Y)/(W)] of the organic silicon compound (W) and phosphoric acid (Y) being 0.03 to 0.12, (8) the solid content mass ratio [(Z)/(W)] of the organic silicon compound (W) and vanadium compound (Z) being 0.05 to 0.17, and (9) the solid content mass ratio [(Z)/(X)] of the fluoro compound (X) and vanadium compound (Z) being 1.3 to 6.0.

Patent Document 4 discloses that the surface-treated steel satisfies all of corrosion resistance, heat resistance, fingerprint resistance, conductivity, coating properties, and black residue resistance during processing.

CITATION LIST

Patent Document

[Patent Document 1]
  Japanese Patent Publication No. 6191806
[Patent Document 2]
  PCT International Publication No. WO 97/00337
[Patent Document 3]
  Japanese Patent Publication No. 6272207
[Patent Document 4]
  Japanese Patent Publication No. 4776458

SUMMARY OF INVENTION

Problems to be Solved by the Invention

However, with the recent advancement of quality requirements, excellent coating adhesion and excellent corrosion resistance have been required for a surface-treated steel having a film such as a chemical conversion treatment film.

As a result of examination by the present inventors, it has been found that Patent Documents 1 to 4 cannot meet such a recent advanced requirement in some cases.

Furthermore, in the chemical conversion treatment containing a resin as disclosed in Patent Documents 1 and 2, since an organic resin component is used, there is also a problem to be solved by the invention that black residue resistance during processing may be insufficient. The black residue resistance at the time of processing refers to resistance against deterioration in external appearance due to generation and adhesion of a black residue substance from a film covering the surface of a metal material and deposition of the black residue substance when a metal is subjected to processing such as press processing, the metal surface being strongly slid by a press die or the like. The black residue substance may be generated due to an organic resin component of the chemical conversion treatment film.

The present invention has been made in view of the above problem to be solved by the invention. An object of the present invention is to provide a surface-treated steel having excellent coating adhesion and excellent corrosion resistance.

Means for Solving the Problem

The present inventors have studied the configuration of a film for achieving both excellent coating adhesion and excellent corrosion resistance in a surface-treated steel having a plated layer and a film. As a result, the present inventors have found that 1) excellent corrosion resistance can be obtained by containing a predetermined element as a constituent element of the film, and 2) adhesion of the film is improved and coating adhesion is improved by forming a layer having a configuration different from other portions in a part or the whole of an interface between the film and the plated layer.

The present invention has been made in view of the above findings. The gist of the present invention is as follows.

[1] A surface-treated steel according to an aspect of the present invention includes: a steel sheet; a plated layer including zinc formed on the steel sheet; and a film formed on the plated layer, wherein the film has a thickness of 100 nm or more and 1000 nm or less, wherein the film includes: an amorphous phase A containing Si, C, O, P, Zn, and V, and one or two or more kinds selected from the group consisting of Ti, Zr, and Al as constituent elements, wherein Zn/Si, which is a peak intensity ratio between Zn and Si, is 1.0 or more, and V/P, which is a mass ratio between V and P, is 0.050 to 1.000 when analysis is performed by EDS; and an amorphous phase B containing Si, O, and Zn, wherein the amorphous phase B has a Zn/Si ratio of less than 1.0, the Zn/Si ratio is a peak intensity ratio between Zn and Si when analysis is performed by EDS, a Zn content of the amorphous phase A is 10 mass % or less, and in a cross section in a thickness direction, a percentage of a length of an interface between the plated layer and the amorphous phase B to a length of an interface between the plated layer and the film is 30% or more. [2] In the surface-treated steel according to [1], a chemical composition of the plated layer may include, by mass %, Al: 0.1% or more and less than 25.0%, Mg: 0% or more and less than 12.5%, Sn: 0% or more and 20% or less, Bi: 0% or more and less than 5.0%, In: 0% or more and less than 2.0%, Ca: 0% or more and 3.0% or less, Y: 0% or more and 0.5% or less, La: 0% or more and less than 0.5%, Ce: 0% or more and less than 0.5%, Si: 0% or more and less than 2.5%, Cr: 0% or more and less than 0.25%, Ti: 0% or more and less than 0.25%, Ni: 0% or more and less than 0.25%, Co: 0% or more and less than 0.25%, V: 0% or more and less than 0.25%, Nb: 0% or more and less than 0.25%, Cu: 0% or more and less than 0.25%, Mn: 0% or more and less than 0.25%, Fe: 0% or more and 5.0% or less, Sr: 0% or more and less than 0.5%, Sb: 0% or more and less than 0.5%, Pb: 0% or more and less than 0.5%, B: 0% or more and less than 0.5%, and the remainder: Zn and impurities.

Effects of the Invention

According to the above aspect of the present invention, it is possible to provide a surface-treated steel having excellent coating adhesion and excellent corrosion resistance.

BRIEF DESCRIPTION OF THE DRAWING

FIG. 1 is a view illustrating an example of a cross section of a surface-treated steel according to the present embodiment.

EMBODIMENTS OF THE INVENTION

Hereinafter, a surface-treated steel according to an embodiment of the present invention (surface-treated steel according to the present embodiment) is described.

As shown in FIG. 1, the surface-treated steel 1 according to the present embodiment includes a steel sheet 11, a plated layer 12 containing zinc formed on the steel sheet 11, and a film 13 formed on the plated layer 12.

The film 13 has an amorphous phase A131 having a predetermined constituent element and an amorphous phase B132 different from the amorphous phase A131.

In FIG. 1, the plated layer 12 and the film 13 are formed only on one surface of the steel sheet 11, but may be formed on both surfaces. Further, the plated layer 12 may be formed on at least a part of the steel sheet (surface), but may be formed on the entire surface. The film 13 may be formed on at least a part of the plated layer 12 (surface), but may be formed on the entire surface.

Hereinafter, the steel sheet 11, the plated layer 12, and the film 13 is described.

<Steel Sheet>

In the surface-treated steel 1 according to the present embodiment, excellent coating adhesion and corrosion resistance can be obtained by the plated layer 12 and the film 13. Therefore, the steel sheet 11 is not particularly limited. The steel sheet 11 may be determined according to a product to be applied, required strength, sheet thickness, and the like, and for example, a hot-rolled steel sheet described in JIS G3113: 2018 or JIS G3131: 2018, or a cold-rolled steel sheet described in JIS G3135: 2018 or JIS G3141: 2017 can be used.

<Plated Layer>

The plated layer 12 included in the surface-treated steel 1 according to the present embodiment is a zinc-based plated layer formed on the surface of the steel sheet 11 and containing zinc.

The chemical composition of the plated layer 12 is not limited as long as it is a zinc-based plated layer. However, when the chemical composition includes, by mass %, Al: 0.1% or more and less than 25.0%, Mg: 0% or more and less than 12.5%, Sn: 0% or more and 20% or less, Bi: 0% or more and less than 5.0%, In: 0% or more and less than 2.0%, Ca: 0% or more and 3.0% or less, Y: 0% or more and 0.5% or less, La: 0% or more and less than 0.5%, Ce: 0% or more and less than 0.5%, Si: 0% or more and less than 2.5%, Cr:

0% or more and less than 0.25%, Ti: 0% or more and less than 0.25%, Ni: 0% or more and less than 0.25%, Co: 0% or more and less than 0.25%, V: 0% or more and less than 0.25%, Nb: 0% or more and less than 0.25%, Cu: 0% or more and less than 0.25%, Mn: 0% or more and less than 0.25%, Fe: 0% or more and 5.0% or less, Sr: 0% or more and less than 0.5%, Sb: 0% or more and less than 0.5%, Pb: 0% or more and less than 0.5%, B: 0% or more and less than 0.5%, and the remainder: Zn and impurities, a more remarkable effect of improving corrosion resistance can be obtained, which is preferable.

The reason for the preferred chemical composition of the plated layer 12 is described. Hereinafter, the numerical range indicated by interposing "to" is based on including the numerical values at both ends as the lower limit value and the upper limit value. However, when it is described that the numerical value is less than or greater than the numerical value, the numerical value is not included as the lower limit value or the upper limit value.

In addition, unless otherwise specified, the % regarding the chemical composition of the plated layer is mass %.

[Al: 0.1% or more and less than 25.0%]

Al is an element effective for improving corrosion resistance in the zinc-based plated layer. In the case of sufficiently obtaining the above effect, the Al content is preferably 0.1% or more.

On the other hand, when the Al content is 25.0% or more, the corrosion resistance of the cut end surface of the plated layer is deteriorated. Therefore, the Al content is preferably less than 25.0%.

The plated layer 12 may contain Al, and the remainder may be composed of Zn and impurities. However, the following elements may be further included as necessary. Even in that case, the Zn content is preferably 50% or more.

[Mg: 0% or more and less than 12.5%]

Mg is an element having an effect of enhancing the corrosion resistance of the plated layer. In the case of sufficiently obtaining the above effect, the Mg content is preferably more than 1.0%.

On the other hand, when the Mg content is 12.5% or more, the effect of improving corrosion resistance is saturated, and there is a case that the workability of the plated layer is deteriorated. In addition, a manufacturing problem arises, such as an increase in the amount of material in a plating bath generated. Therefore, the Mg content is preferably less than $1^20.5\%$.

[Sn: 0% or more and 20% or less]
[Bi: 0% or more and less than 5.0%]
[In: 0% or more and less than 2.0%]

These elements are elements that contribute to improvement of corrosion resistance and sacrificial anticorrosive. Therefore, any one or more kinds of them may be contained. In the case of obtaining the above effect, the amount is preferably 0.05% or more.

Among them, Sn is preferable because it is a low melting point metal and can be easily contained without impairing the properties of the plating bath.

On the other hand, when the Sn content is more than 20%, the Bi content is 5.0% or more, or the In content is 2.0% or more, corrosion resistance is deteriorated. Therefore, it is preferable to set the Sn content to 20% or less, the Bi content to less than 5.0%, and the In content to less than 2.0%, respectively.

[Ca: 0% or More and 3.0% or Less]

Ca is an element that reduces the formation amount of dross that is likely to be formed during operation and contributes to improvement of plating manufacturability. Therefore, Ca may be contained. When this effect is obtained, the Ca content is preferably 0.1% or more.

On the other hand, when the content of Ca is high, the corrosion resistance itself of the flat portion of the plated layer tends to deteriorate, and the corrosion resistance around the welded portion may also deteriorate. Therefore, the Ca content is preferably 3.0% or less.

[Y: 0% or More and 0.5% or Less]
[La: 0% or more and less than 0.5%]
[Ce: 0% or more and less than 0.5%]

Y, La, and Ce are elements that contribute to improvement of corrosion resistance. In the case of obtaining this effect, it is preferable to contain 0.05% or more of each of one or more kinds of these.

On the other hand, when the amount of these elements is excessive, the viscosity of the plating bath increases, and the initial make-up of the plating bath itself is often difficult, and there is a concern that a steel having good plating properties cannot be manufactured. Therefore, the Y content is preferably 0.5% or less, the La content is preferably less than 0.5%, and the Ce content is preferably less than 0.5%.

[Si: 0% or more and less than 2.5%]

Si is an element that contributes to improvement of corrosion resistance. In addition, Si is also an element having an effect of suppressing formation of an excessively thick alloy layer formed between the sheet surface sheet and the plated layer to enhance adhesion between the steel sheet and the plated layer when the plated layer is formed on the steel sheet. When these effects are obtained, the Si content is preferably 0.1% or more. The Si content is more preferably 0.2% or more.

On the other hand, when the Si content is 2.5% or more, excessive Si is precipitated in the plated layer, and not only corrosion resistance is deteriorated but also workability of the plated layer is deteriorated. Therefore, the Si content is preferably less than 2.5%. The Si content is more preferably 1.5% or less.

[Cr: 0% or more and less than 0.25%]
[Ti: 0% or more and less than 0.25%]
[Ni: 0% or more and less than 0.25%]
[Co: 0% or more and less than 0.25%]
[V: 0% or more and less than 0.25%]
[Nb: 0% or more and less than 0.25%]
[Cu: 0% or more and less than 0.25%]
[Mn: 0% or more and less than 0.25%]

These elements are elements that contribute to improvement of corrosion resistance. When this effect is obtained, the amount of one or more of these elements is preferably 0.05% or more.

On the other hand, when the amount of these elements is excessive, the viscosity of the plating bath increases, and the initial make-up of the plating bath itself is often difficult, and there is a concern that a steel having good plating properties cannot be manufactured. Therefore, the amount of each element is preferably less than 0.25%.

[Fe: 0% or more and 5.0% or less]

Fe is mixed into the plated layer as an impurity when the plated layer is manufactured. Fe may be contained up to about 5.0%, but if the content is in this range, the adverse effect on the effect of the surface-treated steel according to the present embodiment is small. Therefore, the Fe content is preferably 5.0% or less.

[Sr: 0% or more and less than 0.5%]
[Sb: 0% or more and less than 0.5%]
[Pb: 0% or more and less than 0.5%]

When Sr, Sb, and Pb are contained in the plated layer, the external appearance of the plated layer changes, a spangle is formed, and improvement in metallic gloss is confirmed. When this effect is obtained, the amount of one or more kinds of Sr, Sb, and Pb is preferably 0.05% or more.

On the other hand, when the amount of these elements is excessive, the viscosity of the plating bath increases, and the initial make-up of the plating bath itself is often difficult, and there is a concern that a steel having good plating properties cannot be manufactured. Therefore, the amount of each element is preferably less than 0.5%.

[B: 0% or more and less than 0.5%]

B is an element that forms various intermetallic compounds by combining with Zn, Al, Mg, or the like when contained in the plated layer. This intermetallic compound has an effect of improving LME. When this effect is obtained, the B content is preferably 0.05% or more. The B content is more preferably 0.1% or more.

On the other hand, when the B content is excessive, there is a concern that the melting point of plating is significantly increased, plating operability is deteriorated, and a surface-treated steel having good plating properties cannot be obtained. Therefore, the B content is preferably less than 0.5%.

The adhesion amount of the plated layer 12 is not limited, but is preferably 10 g/m$^2$ or more per at least one surface for improving corrosion resistance. On the other hand, even when the adhesion amount exceeds 200 g/m$^2$ per one surface, corrosion resistance is saturated and it is economically disadvantageous. Therefore, the adhesion amount is preferably 200 g/m$^2$ or less.

<Film>

As shown in FIG. 1, the film 13 included in the surface-treated steel 1 according to the present embodiment has the amorphous phase A131 and the amorphous phase B132. The amorphous phase B132 is mainly formed on a part of the film 13 on the interface side with the plated layer 12, and contributes to improvement of adhesion of the film 13.

[Amorphous Phase A]

The film 13 included in the surface-treated steel 1 according to the present embodiment is obtained by coating a treatment solution containing a Si compound such as a silane coupling agent, a P compound such as a phosphate, a V compound, and one or more kinds of compounds selected from the group consisting of Ti, Zr, and Al, which are valve metals, onto a plated layer containing zinc under predetermined conditions and drying the treatment solution. The amorphous phase A131 is a layer that occupies a main part of the film 13, and contains, as constituent elements, Si, C, and O derived from a silane coupling agent, P derived from a P compound, V derived from a V compound, one or more kinds selected from the group consisting of Ti, Zr, and Al that are valve metals, and Zn eluted from the plated layer.

Si, C, and O (mainly present as a silicon compound) are elements constituting a matrix of the film 13.

V and P (mainly present as compounds) are inhibitors, and when V and P are not contained, sufficient corrosion resistance cannot be obtained.

In the surface-treated steel 1 according to the present embodiment, it is necessary that the amorphous phase A131 contains P and V, and V/P, which is the ratio of the contents of V and P in mass %, is set to 0.050 to 1.000.

When V/P is less than 0.050, a synergistic effect of P and V cannot be obtained, sufficient corrosion resistance cannot be obtained, and coating adhesion is also deteriorated. In addition, when V/P exceeds 1.000, the elution amount from the film 13 increases, and coating adhesion is deteriorated.

Ti, Zr, and/or Al (valve metal) are elements whose oxides are stable, and when contained in the film, passivate the surface of the film 13 to improve corrosion resistance. When the film 13 does not contain these elements, sufficient corrosion resistance cannot be obtained.

As described later, the valve metal also contributes to the formation of the amorphous phase B. Therefore, if the valve metal is not contained, sufficient coating adhesion cannot be obtained.

As described later, in the surface-treated steel 1 according to the present embodiment, a layer having a Si—O—Zn bond (amorphous phase B) obtained by hydrogen bonding between Zn eluted from the plated layer 12 and Si in the film 13 is formed in the vicinity of the interface between the film 13 and the plated layer 12, thereby improving the adhesion of the film 13.

However, Zn reacts with the inhibitor to form and precipitate zinc phosphate. Therefore, when the elution amount of Zn from the plated layer is excessive and the amount of Zn exceeds 10 mass % in the amorphous phase A, P present as an inhibitor in the film 13 decreases and corrosion resistance decreases. Therefore, the amount of Zn in the amorphous phase A131 is set to 10 mass % or less.

[Amorphous Phase B]

The amorphous phase B132 is a layer having a Si—O—Zn bond formed by a covalent bond by a dehydration condensation reaction between Zn eluted from the plated layer 12 and Si of a silane coupling agent contained in a treatment solution for forming a film when the film 13 is formed. Therefore, the amorphous phase B132 contains Si, O, and Zn. On the other hand, the amorphous phase B132 contains a large amount of Si—O—Zn bonds, but since Zn not bonded to Si preferentially forms an ionic bond with P in the amorphous phase A131, Zn/Si, which is the peak intensity ratio between Zn and Si, is smaller (Zn/Si is less than 1.0) than that of the amorphous phase A in which Zn/Si is 1.0 or more. The reason why the amorphous phase B is produced is unknown, but it is considered that the valve metal serves as a catalyst for the dehydration condensation reaction of the silane coupling agent.

The presence of the amorphous phase B132 at the interface between the film 13 and the plated layer 12 in the film 13 improves the adhesion of the film 13. Therefore, in the surface-treated steel 1 according to the present embodiment, the amorphous phase B132 is formed on the interface side of the film 13 with the plated layer 12. The amorphous phase B132 may be formed intermittently or continuously. When the effect of improving the adhesion is sufficiently obtained, a percentage of the length of the interface between the plated layer 12 and the amorphous phase B132 to the length of the interface between the plated layer 12 and the film 13 needs to be 30% or more when viewed in the cross section in the thickness direction. That is, a percentage of the length of the interface between the plated layer 12 and the amorphous phase A131 to the length of the interface between the plated layer 12 and the film 13 is 70% or less. The percentage of the length of the interface between the plated layer 12 and the amorphous phase B132 to the length of the interface between the plated layer 12 and the film 13 may be 100%, or may be 70% or less from the viewpoint of a heterogeneous reaction field.

The reason why the adhesion is improved by the presence of the amorphous phase B is not clear, but it is considered that the Si—O—Zn bond of the amorphous phase B is formed by a dehydration condensation reaction between Zn (zinc) on the surface of the plated layer and a silane coupling agent contained in a treatment solution for forming a film.

It is considered that the percentage of the length of the interface between the plated layer 12 and the amorphous phase B132 to the length of the interface between the plated layer 12 and the film 13 is also affected by the thickness of the oxide film on the plating surface.

The identification of the amorphous phase A and the amorphous phase B in the film 13 and the contents, peak intensity ratios, and mass ratios of the constituent elements contained in the amorphous phase A and the amorphous phase B can be measured using energy dispersive X-ray spectroscopy (EDS).

Specifically, using a focused ion beam apparatus (RB) FB2000 A (manufactured by Hitachi, Ltd.) or a device equivalent thereto, a thin film sample for TEM observation is prepared from the measurement object position by the FIB-μ sampling method. The outermost surface of the sample is subjected to W deposition for protection. A Cu mesh is used as a mesh.

Using a field emission transmission electron microscope IF-2000 (manufactured by Hitachi, Ltd.), the microstructure of the obtained sample is observed in a field of view at a magnification of 50,000 times at an acceleration voltage of 200 kV, and an element analysis is performed using an attached EDS analyzer delta plus level 2 (manufactured by Kevex) at an acceleration voltage of 200 kV.

Quantitative evaluation is performed for Si, C, O, P, V, Zn, Ti, Zr, and Al by a semi-quantitative method. The amount of the element at the measurement position is determined, and the peak intensity ratio and the mass ratio (ratio of the amount in mass %) of the element are also calculated.

The amorphous phase A is defined as the portion where the peak intensity ratio of Zn to Si, Zn/Si, is 1.0 or more as a result of the measurement and is determined to be amorphous by electron diffraction of TEM, and the amorphous phase B is defined as the portion where the peak intensity ratio between Zn and Si, Zn/Si, is less than 1.0 and which is determined to be amorphous by electron beam diffraction of TEM.

When the amount of Si, C, O, P, Zn, V, Ti, Zr, and Al is 0.5 mass % or more in each of the amorphous phase A and the amorphous phase B, it is determined that the amorphous phase A and the amorphous phase B contain the target element (element of 0.5 mass % or more).

In the measurement, a thicker than the measurement point size is selected, and a point analysis is performed on the center portion of each phase. For each of the phases considered to be the amorphous phase A and the amorphous phase B, measurement is performed at three or more points, and the average value thereof is adopted as the amount in the phase.

In addition, the length (percentage) of the interface between the plated layer and the amorphous phase B in the length of the interface between the plated layer and the film is determined by observing the interface between the plated layer and the film in the range of 10 m or more as the interface length using the field emission transmission electron microscope described above, and measuring the length of the interface between the plated layer and the amorphous phase B among them. (It is calculated by [the length of the interface between the plated layer and the amorphous phase B]/[the length of the interface between the plated layer and the film]×100)

[Film Thickness]

The thickness of the film 13 (including the amorphous phase A131 and the amorphous phase B132) is 100 nm or more and 1000 nm or less.

When the thickness of the film 13 is less than 100 nm, corrosion resistance and coating adhesion are deteriorated. On the other hand, when the thickness of the film 13 exceeds 1000 nm, although corrosion resistance is good, the amount of the inhibitor component eluted from the film 13 increases, and coating adhesion is deteriorated.

The film thickness is measured with an electromagnetic film thickness meter. Specifically, 10 arbitrary points are measured using an electromagnetic film thickness meter, and the average value thereof is taken as the film thickness.

Next, a preferred method for manufacturing the surface-treated steel according to the present embodiment is described.

The surface-treated steel according to the present embodiment can obtain the effect as long as it has the above characteristics regardless of the manufacturing method, but the following manufacturing method is preferable because it can be stably manufactured.

That is, the surface-treated steel according to the present embodiment can be manufactured by a manufacturing method including the following steps:

(I) a plating step of forming a plated layer on a surface of a steel (steel sheet) by immersing the steel in a plating bath containing Zn or by electro plating in an aqueous solution or molten salt containing Zn;

(II) a coating step of coating a surface treatment solution for metal (treatment solution) to a steel having a plated layer; and (III) a heating step of heating the steel coated with the surface treatment solution for metal to form a film containing Si, C, O, P, Zn, and V, and one or more kinds selected from the group consisting of Ti, Al, and Zr.

Preferred conditions for each step are described.

[Plating Step]

The plating step is not particularly limited. The plating may be performed by a normal method so that sufficient plating adhesion can be obtained.

The method for manufacturing the steel to be subjected to the plating step is also not limited.

For example, a method for manufacturing a zinc-based plated steel sheet prescribed in JIS G3302: 2019 may be used, or a method for manufacturing a plated steel sheet prescribed in JIS G3323: 2019 or JIS G3313: 2017 may be used.

The composition of the plating bath may also be adjusted according to the composition of the plated layer to be obtained.

After the cooling, it is desirable to avoid excessive oxidation of the surface, adhesion of oil, and the like until the coating step, and to control the plating surface state so as not to repel the chemical agent.

[Coating Step]

In the coating step, a surface treatment solution for metal containing a Si compound, a P compound, a V compound, and a compound of Ti, Zr, and/or Al is coated to a steel such as a steel sheet having a plated layer containing Zn. The Si compound, the P compound, the V compound, and the Ti compound, the Zr compound, and/or the Al compound are contained in order to be a constituent element of the film. The P compound also has an effect of eluting Zn of the plated layer by an etching reaction, and contributes to the production of the amorphous phase B by combination with the valve metal.

In the coating step, the method for coating the surface treatment solution for metal is not limited. For example, it can be coated using a roll coater, a bar coater, a spray, or the like.

The film thickness can be changed by changing the coating amount according to the rotation speed or the peripheral speed ratio between the pick-up roll and the applicator roll.

In the present embodiment, the Si compound contained in the surface treatment solution for metal is preferably a silane coupling agent containing an isocyanate group, an amino group, an epoxy group, or the like in the molecule for forming the amorphous phase B, and among them, an isocyanate group is more preferable.

The concentration of the Si compound in the surface treatment solution for metal is desirably 5 to 20 mass %.

In the present embodiment, the P compound contained in the surface treatment solution for metal is not particularly limited, and examples thereof include phosphoric acid, ammonium phosphate, potassium phosphate, and sodium phosphate. Among them, phosphoric acid is more preferable. When phosphoric acid is used, more excellent corrosion resistance can be obtained. The concentration of the P compound in the surface treatment solution for metal is desirably 1 to 5 mass %.

Examples of the V compound contained in the surface treatment solution for metal include vanadium pentoxide $V_2O_5$, metavanadic acid $HVO_3$, ammonium metavanadate, sodium metavanadate, vanadium oxytrichloride $VOCl_3$, vanadium trioxide $V_2O_3$, vanadium dioxide $VO_2$, vanadium oxysulfate $VOSO_4$, vanadium oxyacetylacetonate $VO(OC(=CH_2)CH_2COCH_3)_2$, vanadium acetylacetonate $V(OC(=CH_2)CH_2COCH_3)_3$, vanadium trichloride $VCl_3$, and phosphovanadomolybdic acid. In addition, a pentavalent vanadium compound reduced to tetravalent to divalent one with an organic compound having at least one functional group selected from the group consisting of a hydroxyl group, a carboxylic acid, a carboxyl group, a primary to tertiary amino group, an amide group, a phosphoric acid group, and a phosphonic acid group can also be used. The concentration of the V compound in the surface treatment solution for metal is desirably 0.0001 to 4.0 mass %.

Examples of the Ti compound, the Zr compound, and the Al compound include titanium nitrate, zirconium nitrate, and aluminum nitrate.

[Heating Step]

In the heating step, the steel coated with the surface treatment solution for metal is heated, dried, and baked to form a film. As for the heating temperature (drying temperature), the peak metal temperature is preferably 60 to 200° C., and more preferably 80 to 150° C. It is not preferable that the peak metal temperature is lower than 60° C. because the solvent of the surface treatment solution for metal is not completely volatilized. On the other hand, when the peak metal temperature exceeds 200° C., the solvent drying effect by heating is saturated, which is not economical, and therefore, it is not preferable.

In the heating step, the method for heating the surface treatment solution for metal is not limited. For example, heating can be performed using IH, a hot blast furnace, or the like, and drying can be performed.

In addition, when the time from the coating of the surface treatment solution for metal (treatment solution) at room temperature (at the time of completion of coating) to the reaching of the peak metal temperature is long, the elution amount of Zn from the plated layer increases, and thus the time from the coating of the surface treatment solution for metal (treatment solution) to the reaching of the peak metal temperature is preferably 10.0 seconds or less, and more preferably 4.0 seconds or less.

The surface-treated steel after reaching the peak metal temperature is cooled to around room temperature. The cooling conditions are not particularly limited, but gas cooling, mist cooling using a liquid, and liquid submersion cooling can be considered.

EXAMPLES

As a plated steel sheet for forming a film on a surface, a hot-dip galvanized steel sheet which is a zinc-plated steel sheet prescribed in JIS G3302: 2019 and in which a plating adhesion amount is represented by Z08 was prepared.

As shown in Table 1, any one of the following kinds of treatment solutions A to S was coated to the plated steel sheet using a roll coater.

(Treatment Solution A)

An aqueous solution prepared by dissolving 75 mg of vanadyl acetylacetonate, 3 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution B)

An aqueous solution prepared by dissolving 70 mg of vanadyl acetylacetonate, 2 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution C)

An aqueous solution prepared by dissolving 70 mg of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution D)

An aqueous solution prepared by dissolving 100 mg of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1:1 so that the mass ratio of 3-isocyanate propyltriethoxysilane is 10% and left to stand for 3 hours as a base liquid.

(Treatment Solution E)

An aqueous solution prepared by dissolving 170 mg of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1:1 so that the mass ratio of 3-isocyanate propyltriethoxysilane is 10% and left to stand for 3 hours as a base liquid.

(Treatment Solution F)

An aqueous solution prepared by dissolving 1.7 g of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution G)

An aqueous solution prepared by dissolving 9.0 g of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution H)

An aqueous solution prepared by dissolving 1 g of diammonium hydrogen phosphate and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution I)

An aqueous solution prepared by dissolving 170 mg of vanadyl acetylacetonate and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution J)

An aqueous solution prepared by dissolving 170 mg of vanadyl acetylacetonate and 1 g of diammonium hydrogen phosphate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution K)

An aqueous solution prepared by dissolving 170 mg of vanadyl acetylacetonate, 1 g of diammonium hydrogen phosphate, and 1 g of zirconium nitrate in 100 mL of a solution prepared with a mixture of ethanol and 0.05% aqueous ammonia at a ratio of 1:1 so that the mass ratio of 3-isocyanate propyltriethoxysilane is 10% and left to stand for 3 hours as a base liquid.

(Treatment Solution L)

An aqueous solution prepared by dissolving 170 mg of vanadyl acetylacetonate, 1 g of diammonium hydrogen phosphate, and 1 g of aluminum nitrate in 100 mL of a solution prepared with a mixture of ethanol and 0.05% aqueous ammonia at a ratio of 1:1 so that the mass ratio of 3-isocyanate propyltriethoxysilane is 10% and left to stand for 3 hours as a base liquid.

(Treatment Solution M)

An aqueous solution prepared by dissolving 170 mg of vanadyl acetylacetonate, 1 g of diammonium hydrogen phosphate, and 0.5 g each of titanium nitrate and zirconium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution N)

An aqueous solution prepared by dissolving 170 mg of vanadyl acetylacetonate, 1 g of diammonium hydrogen phosphate, and 0.5 g each of titanium nitrate and aluminum nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution O)

An aqueous solution prepared by dissolving 170 mg of vanadyl acetylacetonate, 1 g of diammonium hydrogen phosphate, and 0.5 g each of zirconium nitrate and aluminum nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution P)

An aqueous solution prepared by dissolving 84 mg of vanadyl acetylacetonate, 1 g of diammonium hydrogen phosphate and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution Q)

An aqueous solution prepared by dissolving 1.6 g of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution R)

An aqueous solution prepared by dissolving 1.3 g of vanadyl acetylacetonate, 1 g of diammonium hydrogen phosphate, and 1 g of titanium nitrate in 100 mL of a solution prepared with a mixture of ethanol and 0.05% aqueous ammonia at a ratio of 1: 1 so that the mass ratio of 3-isocyanate propyltriethoxysilane is 10% and left to stand for 3 hours as a base liquid.

(Treatment Solution S)

An aqueous solution prepared by dissolving 170 mg of vanadyl acetylacetonate, 1 g of diammonium hydrogen phosphate and 1 g of titanium nitrate in 100 mL of a solution prepared with a mixture of ethanol and 0.05% aqueous ammonia at a ratio of 1:1 so that the mass ratio of 3-isocyanate propyltriethoxysilane is 3% and the mass ratio of silica sol (ST-NXS manufactured by Nissan Chemical Corporation) is 7%, and left to stand for 3 hours as a base liquid.

After the surface treatment solution for metal was coated to the steel sheet at room temperature (20° C.), the steel sheet was left as necessary, and then heated to the peak metal temperature in a hot air drying furnace so that the time from the completion of coating to the attainment of the peak metal temperature was the value shown in Table 1. The average heating rate is the average heating rate from the completion of coating to the reaching of the peak metal temperature, which is calculated including the standing time.

Thereafter, air cooling was performed to room temperature.

As a result, surface-treated steels Nos. 1 to 30 were obtained.

TABLE 1

| | | Manufacture conditions | | |
|---|---|---|---|---|
| | | Heating | | |
| No. | Kind of coating treatment solution | Average heating rate ° C./ seconds | Peak metal temperature ° C. | Time from completion of coating at room temperature (20° C.) to reaching peak metal temperature seconds |
| 1 | A | 20 | 90 | 3.5 |
| 2 | B | 20 | 90 | 3.5 |
| 3 | C | 20 | 90 | 3.5 |
| 4 | D | 20 | 90 | 3.5 |
| 5 | E | 20 | 90 | 3.5 |
| 6 | F | 20 | 90 | 3.5 |
| 7 | G | 20 | 90 | 3.5 |
| 8 | E | 100 | 90 | 0.7 |
| 9 | E | 10 | 90 | 7.0 |
| 10 | E | 5 | 90 | 14.0 |
| 11 | H | 20 | 90 | 3.5 |

TABLE 1-continued

| | | Manufacture conditions | | |
|---|---|---|---|---|
| | | | Heating | |
| No. | Coating Kind of treatment solution | Average heating rate ° C./ seconds | Peak metal temperature ° C. | Time from completion of coating at room temperature (20° C.) to reaching peak metal temperature seconds |
| 12 | I | 20 | 90 | 3.5 |
| 13 | J | 20 | 90 | 3.5 |
| 14 | K | 20 | 90 | 3.5 |
| 15 | L | 50 | 150 | 2.6 |
| 16 | M | 30 | 140 | 4.0 |
| 17 | N | 30 | 140 | 4.0 |
| 18 | O | 20 | 90 | 3.5 |
| 19 | E | 20 | 90 | 3.5 |
| 20 | E | 20 | 90 | 3.5 |
| 21 | E | 20 | 120 | 5.0 |
| 22 | E | 20 | 120 | 5.0 |
| 23 | E | 20 | 90 | 3.5 |
| 24 | E | 20 | 90 | 3.5 |
| 25 | P | 20 | 90 | 3.5 |
| 26 | Q | 20 | 90 | 3.5 |
| 27 | E | 7 | 90 | 10.5 |
| 28 | L | 50 | 150 | 2.6 |
| 29 | R | 20 | 90 | 3.5 |
| 30 | S | 20 | 90 | 3.5 |

With respect to the obtained surface-treated steel, the amorphous phase A and the amorphous phase B were identified by the above-described method (Zn/Si and whether it is amorphous or not), and the thickness of the film, the elemental analysis of the amorphous phase A and the amorphous phase B, and the percentage of the length of the interface between the plated layer and the amorphous phase B to the length of the interface between the plated layer and the film were determined.

The results are shown in Table 2.

TABLE 2

| | Amorphous phase A | | | | | | | | | | Amorphous phase B | | Corrosion resistance | Coating adhesion | |
|---|---|---|---|---|---|---|---|---|---|---|---|---|---|---|---|
| | | | | | | Zn content | | Valve metal | | | Absent/ intermittently | Percentage of interface between film and plated layer | Film Thickness | White rust generation area fraction | Residual area: fraction | |
| No. | Si | C | O | P | V | mass % | V/P | Ti | Zr | Al | present | % | nm | % | % | Remarks |
| 1 | ● | ● | ● | ● | ● | 5 | 0.015 | ● | | | Intermittent | 60 | 400 | 30 | 60 | Comparative Examples |
| 2 | ● | ● | ● | ● | ● | 5 | 0.021 | ● | | | Intermittent | 60 | 400 | 25 | 70 | Comparative Examples |
| 3 | ● | ● | ● | ● | ● | 5 | 0.043 | ● | | | Intermittent | 65 | 400 | 20 | 75 | Comparative Examples |
| 4 | ● | ● | ● | ● | ● | 5 | 0.061 | ● | | | Intermittent | 60 | 400 | 2 | 98 | Inventive Examples |
| 5 | ● | ● | ● | ● | ● | 5 | 0.100 | ● | | | Intermittent | 60 | 400 | 2 | 90 | Inventive Examples |
| 6 | ● | ● | ● | ● | ● | 5 | 1.000 | ● | | | Intermittent | 50 | 400 | 2 | 80 | Inventive Examples |
| 7 | ● | ● | ● | ● | ● | 5 | 5.500 | ● | | | Intermittent | 60 | 400 | 2 | 60 | Comparative Examples |
| 8 | ● | ● | ● | ● | ● | 2 | 0.100 | ● | | | Intermittent | 60 | 400 | 2 | 98 | Inventive Examples |
| 9 | ● | ● | ● | ● | ● | 10 | 0.100 | ● | | | Intermittent | 60 | 400 | 5 | 95 | Inventive Examples |
| 10 | ● | ● | ● | ● | ● | 20 | 0.100 | ● | | | Intermittent | 70 | 400 | 20 | 100 | Comparative Examples |
| 11 | ● | ● | ● | ● | — | 5 | 0.000 | ● | | | Intermittent. | 55 | 400 | 20 | 60 | Comparative Examples |
| 12 | ● | ● | ● | — | ● | 5 | — | ● | | | Intermittent | 55 | 400 | 50 | 100 | Comparative Examples |
| 13 | ● | ● | ● | ● | ● | 5 | 0.100 | ● | | | Absent | 0 | 400 | 60 | 30 | Comparative Examples |
| 14 | ● | ● | ● | ● | ● | 5 | 0.100 | | ● | | Intermittent | 60 | 400 | 2 | 98 | Inventive Examples |
| 15 | ● | ● | ● | ● | ● | 5 | 0.100 | | | ● | Intermittent | 40 | 400 | 5 | 98 | Inventive Examples |
| 16 | ● | ● | ● | ● | ● | 5 | 0.100 | ● | ● | | Intermittent | 60 | 400 | 2 | 98 | Inventive Examples |
| 17 | ● | ● | ● | ● | ● | 5 | 0.100 | ● | | ● | Intermittent | 50 | 400 | 3 | 98 | Inventive Examples |
| 18 | ● | ● | ● | ● | ● | 5 | 0.100 | | ● | ● | Intermittent | 50 | 400 | 3 | 98 | Inventive Examples |

TABLE 2-continued

| | Amorphous phase A | | | | | | | | | | Amorphous phase B | | | | |
|---|---|---|---|---|---|---|---|---|---|---|---|---|---|---|---|
| | | | | | | Zn content | | Valve metal | | | Absent/ intermittently | Percentage of interface between film and plated layer | Film Thickness | Corrosion resistance White rust generation area fraction | Coating adhesion Residual area: fraction | |
| No. | Si | C | O | P | V | mass % | V/P | Ti | Zr | Al | present | % | nm | % | % | Remarks |
| 19 | ● | ● | ● | ● | ● | 5 | 0.100 | ● | | | Intermittent | 40 | 50 | 40 | 60 | Comparative Examples |
| 20 | ● | ● | ● | ● | ● | 5 | 0.100 | ● | | | Intermittent | 50 | 100 | 5 | 95 | Inventive Examples |
| 21 | ● | ● | ● | ● | ● | 5 | 0.100 | ● | | | Intermittent | 55 | 200 | 3 | 100 | Inventive Examples |
| 22 | ● | ● | ● | ● | ● | 5 | 0.100 | ● | | | Intermittent | 65 | 800 | 2 | 98 | Inventive Examples |
| 23 | ● | ● | ● | ● | ● | 5 | 0.100 | ● | | | Intermittent | 70 | 1000 | 1 | 90 | Inventive Examples |
| 24 | ● | ● | ● | ● | ● | 5 | 0.100 | ● | | | Intermittent | 75 | 1500 | 1 | 60 | Comparative Examples |
| 25 | ● | ● | ● | ● | ● | 5 | 0.051 | ● | | | Intermittent | 60 | 400 | 5 | 98 | Inventive Examples |
| 26 | ● | ● | ● | ● | ● | 5 | 1.100 | ● | | | Intermittent | 60 | 400 | 2 | 75 | Comparative Examples |
| 27 | ● | ● | ● | ● | ● | 12 | 0.100 | ● | | | Intermittent | 70 | 400 | 20 | 100 | Comparative Examples |
| 28 | ● | ● | ● | ● | ● | 5 | 0.100 | | ● | | Intermittent | 30 | 400 | 5 | 98 | Inventive Examples |
| 29 | ● | ● | ● | ● | ● | 5 | 0.800 | ● | | | Intermittent | 55 | 400 | 2 | 85 | Inventive Examples |
| 30 | ● | ● | ● | ● | ● | 5 | 0.100 | ● | | | Intermittent | 23 | 400 | 30 | 60 | Comparative Examples |

● of each element indicates that it is contained (the content is 0.5 mass % or more).

In addition, the corrosion resistance and coating adhesion of the obtained surface-treated steel were evaluated by the following method.

[Corrosion Resistance]

A flat sheet test piece was prepared, and each test piece was subjected to a salt water spray test in accordance with JIS Z 2371:2015 to evaluate the state of white rust generation on the surface after 120 hours (percentage of the area where white rust was generated in the area of the test piece).

When the white rust generation area fraction was 5% or less, it was judged that corrosion resistance was excellent.

[Coating Adhesion]

A flat sheet test piece was prepared, and a white coating (Amilac #1000) was coated so that the film thickness after drying was 20 m. This test piece was immersed in boiling water for 30 minutes, and then stretch forming is performed to a height of 7 mm with a punch stretch forming apparatus (Erichsen Test), and a tape peeling test was performed to confirm the coating film residual ratio.

When the residual area fraction of the coating film was 80% or more, it was judged that the coating adhesion was excellent.

As can be seen from Tables 1 and 2, in Nos. 4 to 6, 8, 9, 14 to 18, 20 to 23, 25, 28, and 29 containing a predetermined amount of Si, C, O, P, Zn, and V, and one or two or more kinds selected from the group consisting of Ti, Zr, and Al, and having a length percentage of an interface with the amorphous phase B of 30% or more, excellent corrosion resistance and coating adhesion are obtained.

On the other hand, Comparative Examples Nos. 1 to 3, 7, 10 to 13, 19, 24, 26, 27, and 30 that do not satisfy one or more of the requirements of the present invention are inferior in any one or both of corrosion resistance and coating adhesion.

FIELD OF INDUSTRIAL APPLICATION

According to the present invention, it is possible to provide a surface-treated steel having excellent coating adhesion and excellent corrosion resistance. The surface-treated steel has high industrial applicability.

BRIEF DESCRIPTION OF THE REFERENCE SYMBOLS

1 Surface-treated steel
11 Steel sheet
12 Plated layer
13 Film
131 Amorphous phase A
132 Amorphous phase B

What is claimed is:

1. A surface-treated steel comprising:
a steel sheet;
a plated layer including zinc formed on the steel sheet; and
a film formed on the plated layer,
wherein the film has a thickness of 100 nm or more and 1000 nm or less,
wherein the film includes:
an amorphous phase A containing Si, C, O, P, Zn, and V, and one or more selected from the group consisting of Ti, Zr, and Al as constituent elements, wherein Zn/Si, which is a peak intensity ratio between Zn and Si, is 1.0 or more, and V/P, which is a mass ratio between V and P, is 0.050 to 1.000 when analysis is performed by EDS; and an amorphous phase B containing Si, O, and Zn, wherein the amorphous phase B has a Zn/Si of less than 1.0, the Zn/Si is a peak intensity ratio between Zn and Si when analysis is performed by EDS, a Zn content of the amorphous phase A is 10 mass % or less, and in a cross section in a thickness direction, a percentage of a length of an interface between the plated layer and the amorphous phase B to a length of an interface between the plated layer and the film is 30% or more.

2. The surface-treated steel according to claim 1, wherein a chemical composition of the plated layer includes, by mass %, Al: 0.1% or more and less than 25.0%,
Mg: 0% or more and less than 12.5%,
Sn: 0% or more and 20% or less,
Bi: 0% or more and less than 5.0%,
In: 0% or more and less than 2.0%,
Ca: 0% or more and 3.0% or less,
Y: 0% or more and 0.5% or less,
La: 0% or more and less than 0.5%,
Ce: 0% or more and less than 0.5%,
Si: 0% or more and less than 2.5%,
Cr: 0% or more and less than 0.25%,
Ti: 0% or more and less than 0.25%,
Ni: 0% or more and less than 0.25%,
Co: 0% or more and less than 0.25%,
V: 0% or more and less than 0.25%,
Nb: 0% or more and less than 0.25%,
Cu: 0% or more and less than 0.25%,
Mn: 0% or more and less than 0.25%,
Fe: 0% or more and 5.0% or less,
Sr: 0% or more and less than 0.5%,
Sb: 0% or more and less than 0.5%,
Pb: 0% or more and less than 0.5%,
B: 0% or more and less than 0.5%, and
the remainder: Zn and impurities.

\* \* \* \* \*